United States Patent [19]

Dix et al.

[11] 4,267,000

[45] May 12, 1981

[54] METHOD FOR MASKING GLASS, GLASS-CERAMIC AND CERAMIC SURFACES

[75] Inventors: James F. Dix, Horseheads; Clarence E. Ford, Jr., Painted Post; Ray B. Forker, Jr., Horseheads, all of N.Y.; Ronald E. Johnson, Tioga, Pa.

[73] Assignee: Corning Glass Works, Corning, N.Y.

[21] Appl. No.: 74,908

[22] Filed: Sep. 13, 1979

[51] Int. Cl.$^3$ ................................................ B44C 1/18
[52] U.S. Cl. ...................................... 156/235; 156/246; 156/277; 260/24; 260/27 EV; 260/28.5 AV; 427/282; 427/287
[58] Field of Search ....................... 427/259, 282, 287; 260/27 EV, 24, 28.5 AV; 156/230, 232, 235, 246, 277

[56] References Cited

U.S. PATENT DOCUMENTS

| | | | |
|---|---|---|---|
| 3,255,695 | 6/1966 | Johnson et al. | 101/211 |
| 3,554,836 | 1/1971 | Steindorf | 156/240 |
| 3,647,730 | 3/1972 | Rott et al. | 260/27 EV X |
| 3,688,695 | 9/1972 | James | 101/211 |
| 3,691,120 | 9/1972 | Susuki et al. | 260/27 EV |
| 3,896,069 | 7/1975 | Kosaka et al. | 260/27 EV X |
| 3,932,681 | 1/1976 | Forker, Jr. et al. | 427/282 |

*Primary Examiner*—Evan K. Lawrence
*Attorney, Agent, or Firm*—Clinton S. Janes, Jr.

[57] ABSTRACT

A method for masking selected areas of a glass, glass-ceramic, or ceramic surface against subsequently-applied coating compositions. The method contemplates three general steps: (a) a molten thermoplastic masking coating consisting essentially of about 10–60% bentonite clay, 0–40% of a refractory metal oxide, and 40–80% of a thermoplastic organic medium is applied from a heated surface onto the surface of an elastomeric or silicone-coated body; (b) the thermoplastic coating is cooled thereon to a temperature at which the coating exhibits sufficient tack and cohesiveness to permit transfer from the elastomeric or silicone-coated body; and (c) the so-coated body is brought into contact with the surface of a glass, glass-ceramic, or ceramic article to transfer the coating thereto.

6 Claims, No Drawings

METHOD FOR MASKING GLASS, GLASS-CERAMIC AND CERAMIC SURFACES

BACKGROUND OF THE INVENTION

U.S. Pat. No. 3,932,681 discusses the general practice of applying coating compositions to selected portions only of vitreous (glass), glass-ceramic, and ceramic articles through the use of masking techniques. Hence, those portions of the articles which are not to receive a coating are covered with a masking material which is inert both to the vitreous, glass-ceramic, or ceramic substrate and to the coating composition to be applied, and which is readily removable from the substrate after the desired functional coating has been applied thereto. Inasmuch as the coating compositions are frequently applied while at quite elevated temperatures, e.g., greater than 500° C. and, occasionally, higher than 700° C., the masking material must demonstrate a softening point or melting point greater than the temperature to be encountered during the coating process. Accordingly, the masking materials may be required to maintain their particulate nature at temperatures in excess of 1000° C.

As explained by the patentees, the mask must be impermeable and capable of being readily removed from essentially non-porous vitreous, glass-ceramic, or ceramic surfaces even after being fired to temperatures of 700° C. and higher. The masking compositions described in that patent consisted of about 40-90% by weight of bentonite clay and about 10-60% by weight of refractory metal oxide release agent, the latter being preferably selected from the group of silica, titania, iron oxide, tin oxide, calcium oxide, 96% silica, and alundum cement. Both constituents are utilized in a very finely-divided state, viz., the particles pass through a 100 mesh United States Standard Sieve (149 microns).

Bentonite is a clay having a volcanic origin wherein the major constituent is the mineral montmorillonite. Although its chemical composition is similar to many commercially-available clays, the physical constitution thereof is different therefrom in containing more colloidal matter.

The bentonite clay and release agent were suspended in a water-containing vehicle selected from the group of water and mixtures of water with lower alkanols, viz., alkanols of 1-4 carbon atoms. The preferred vehicle consisted of about 20-50% by volume of methanol. The resultant slurry was applied to the substrate via conventional means, e.g., brushing, dipping, rolling, or spraying, and the vehicle was subsequently removed by heating the substrate surface to a temperature above the boiling point of the vehicle. Typically, the slurries consisted of 10-35% by weight solids and 65-90% by weight liquid vehicle.

The masking composition was readily removed from the substrate surface after the application of the desired functional conductive, decorative, protective, or reflective coating to the vitreous, glass-ceramic, or ceramic ware. Such second coating could be, for example, an electrically-conductive metal oxide, a decorative glass enamel, a metal oxide stain, or any other similarly functional coating. The removal of the masking was readily accomplished through rinsing in water with occasional light hand rubbing even after the masking composition had been fired at temperatures up to about 700° C. The inclusion of the refractory metal oxide release agent, however, was demanded to insure ready removal from the ware surface.

A more detailed discussion of compositions operable as masking materials for vitreous, glass-ceramic, and ceramic ware and of the method for applying and removing such materials is provided in said U.S. Pat. No. 3,932,681, and specific reference is directed to that disclosure for such discussion.

It has been appreciated that in certain applications it would be useful to employ a masking coating which could print a design, a pattern, or other representation onto the surface of vitreous, glass-ceramic, or ceramic ware while concurrently providing the function of an impermeable masking covering. Such a coating could be utilized, for example, for date coding, for affixing a trademark, or for applying a decorative design, where the surface beneath the masking formulation is an area not permanently covered with a functional conductive, decorative, protective, or reflective coating. The bulk of the masking coating, in like manner to that described in U.S. Pat. No. 3,932,681, would be readily removable from the ware surface leaving the ware surface bare.

SUMMARY OF THE INVENTION

The principal objective of the instant invention is to provide a method utilizing suitable compositions for simultaneously printing a representation onto the surface of a glass, glass-ceramic, or ceramic article and impermeably masking that surface area from contact with a functional coating applied thereover, the bulk of said compositions being readily removable from the surface of said article leaving said representation printed onto the surface thereof.

Another objective of this invention is to provide such compositions which can be fired to relatively high temperatures, i.e., up to 700° C. and higher, without attacking the surface of said article and/or adversely affecting the composition itself.

Accomplishment of those objectives can be achieved by formulating thermoplastic (hot melt) masking compositions consisting essentially, by weight, of about 10-60% bentonite clay, 40-80% thermoplastic organic medium, and zero to 40% of a refractory metal oxide.

The method of the instant invention comprehends three general steps:

(1) a molten thermoplastic masking coating consisting essentially of bentonite clay and organic medium is applied from a heated surface onto the surface of an elastomer or silicone-coated body;

(2) the masking coating is cooled to a temperature at which said masking coating exhibits sufficient tack and cohesiveness to enable transfer of the resultant coating from said elastomer or silicone-coated body; and, thereafter, (3) the elastomer or silicone-coated body is brought into contact with the surface of a glass, glass-ceramic, or ceramic article and the coating thereby transferred from said body to said article

DETAILED DESCRIPTION

Organic media operable in the instant formulations are those which, when blended with inorganic fillers, yield thermoplastic (hot melt) inks suitable for printing via offset processes. These media can be classified into three general types: (1) pressure-sensitive, hot melt adhesives; (2) high viscosity liquids consisting of medium molecular weight polymers blended with low volatility plasticizers; and (3) polymer-fortified, low-melt point waxes. With each type only specifically-defined formulations are operable due to the necessity of obtaining a suitable combination of such properties as good burnout characteristics, low affinity for elastomeric or silicone surfaces, and sufficient cohesive strength to permit transfer as an integral film. The resultant inks are also readily categorized into three distinct classes based upon the type of organic medium utilized in the preparation thereof, but each class demonstrates thermoplastic (hot melt) properties in the sense that all the inks soften and flow with heat to provide viscosities suitable for printing when heated to temperatures about 180°–300° F. ($\sim$82°–149° C.). The Type I inks retain the pressure sensitivity of the organic medium and can be formulated so as to display pressure sensitivity at room temperature and above, or solely at elevated temperatures. The Type II inks are generally stiff, tacky pastes such that they exhibit permanent, room temperature pressure sensitivity. The Type III inks demonstrate a wax-like nature and, consequently, do not manifest any pressure sensitivity. One example of a Type I inks is described in U.S. application Ser. No. 74,907, filed concurrently herewith by Ronald E. Johnson, one of the present applicants.

That application describes thermoplastic inks suitable for decorating glass, glass-ceramic, and ceramic articles exhibiting pressure sensitivity at temperatures substantially below their Ring and Ball (R&B) softening points which are prepared from a formulation consisting essentially, in weight percent, of:

(a) about 50–80% of a vitrifiable, inorganic flux optionally containing up to about 30% by weight inorganic pigments and opacifiers;

(b) about 2–20% of an ethylene-ester copolymer resin having about 8–40% by weight of a copolymerized resin selected from the group consisting of vinyl alcohol esters of $C_1$–$C_4$ saturated monocarboxylic acids and $C_1$–$C_5$ saturated alcohol esters of acrylic or methacrylic acid, the molecular weight of the polymer being such as to yield a melt index, as defined by ASTM D1238, of about 20–400 g/10 minutes;

(c) about 4–20% of an amorphous tackifying resin having an R&B softening point of about 40°–110° C.;

(d) 0–10% of a modifying polyolefin resin selected from the group consisting of a low molecular weight polyethylene resin with a melt index, as defined by ASTM D1238, greater than about 20 g/10 minutes and an amorphous polypropylene resin having a melt viscosity of about 500–15,000 cps at 375° F. ($\sim$191° C.); and (e) about 5–25% of an organic wax and/or plasticizer compatible with the resins of paragraphs (b), (c), and (d) and having an R&B softening point of less than about 100° C.

In general, the thermoplastic (hot melt) inks disclosed therein will demonstrate an R&B softening point between about 122°–203° F. (50°–95° C.) with a viscosity at 212° F. (100° C.) of about 100–1000 poises, as determined with a 100 rpm Brookfield thermocel. The vitrifiable inorganic fluxes optionally containing pigments and opacifiers are standard materials of commerce which, desirably, will have an average particle size less than about 20 microns. The most ideal ethylene-ester copolymer resins are ethylene-vinyl acetate and ethylene-ethylacrylate. The preferred amorphous tackifying resin will comprise wood rosin or one of its ester derivatives, e.g., the glycerol and pentaerythritol esters, although other classes of tackifying resins, such as polyterpenes and aliphatic hydrocarbons are also operable. Numerous waxes and plasticizers have been found operable, the four primary criteria therefor being compatibility with the resin system employed, a melting point below 100° C., low volatility in the temperature range of 100°–150° C., and satisfactory burnout characteristics. Examples of suitable waxes include paraffin and microcrystalline waxes, animal and vegetable waxes, fatty acids and alcohols, fatty acid esters, glycerides, hydrogenated oils, oxazoline wax, and such synthetic hydrocarbon waxes as the low molecular weight polyethylene waxes. Examples of operable plasticizers include mineral oil, hydrogenated oils, and the common families of ester plasticizers such as the adipates and phthalates.

Customarily, when pressure sensitivity at temperatures of about 37° C. and below is desired, a plasticizer will be incorporated into the formulation with mineral oil and dioctylphthalate being frequent choices for that purpose. In contrast, when pressure sensitivity solely at elevated temperatures is sought, a wax will normally be included with paraffin wax (melting point about 54° C.) and stearyl alcohol (melting point about 58° C.) being especially suitable.

The optionally-present, modifying olefinic resin can consist of either a relatively low molecular weight polyethylene resin for reducing pressure sensitivity or an amorphous (atactic) polypropylene resin for increasing pressure sensitivity. Other modifying constituents commonly utilized in the commercial adhesives, ink, and glass decorating industries, e.g., dispersants, anti-oxidants, and defoamers, may likewise be added up to about 5% total without deleteriously affecting the character of the final product.

Those thermoplastic inks can be transferred readily from elastomeric or silicone-coated surfaces either immediately or at a later time. They are also useful in those offset printing processes involving the use of a collector elastomer.

As will be shown hereinafter, the inorganic fluxes, opacifiers, and pigments described in that application are omitted from the masking compositions found operable in the instant inventive method. It will be apparent that the concentrations of the organic constituents will be adjusted to compensate therefor. Accordingly, where the inorganic components are not present, the organic portion of the masking composition will consist essentially, in weight percent, of about (a) 10–40% of an ethylene-ester copolymer;

(b) 20–40% of an amorphous tackifying resin;

(c) 0–20% of a modifying polyolefin resin; and (d) 20–50% of an organic wax and/or plasticizer.

An example of a Type II organic medium operable in the present invention is disclosed in U.S. application Ser. No. 74,909, also filed concurrently herewith by Ronald E. Johnson, one of the present applicants.

That application describes thermoplastic inks suitable for decorating glass, glass-ceramic, and ceramic articles which display pressure sensitivity at temperatures at or slightly above room temperature, thereby allowing their transfer from elastomeric or silicone-coated surfaces either immediately or at a later time. They are also operable in those offset printing techniques contemplating the use of a collector elastomer.

The inks described in that application consist essentially, in weight percent, of:

(a) about 50–80% of a vitrifiable, inorganic flux optionally containing up to about 40% by weight inorganic pigments and opacifiers;

(b) about 5–25% of a polyoxyalkylene ether having a molecular weight between about 200–10,000;

(c) about 2–20% of a water soluble, cohesive-strength-imparting polymer having a molecular weight between about 25,000–500,000; and, optionally, (d) up to about 20% of a modifying wax and/or plasticizer selected from the group consisting of a polyoxyalkylene ether wax having a softening point between about 35°–65° C. and a molecular weight between about 1000–25,000 and a compatible ester having a softening point below about 65° C.

The thermoplastic inks described there will display R&B softening points of less than about 65° C. and a viscosity at about 93° C. of about 150–600 poises, as measured with a 100 rpm Brookfield thermocel. The vitrifiable fluxes with the optional opacifiers and pigments are standard products of commerce which, desirably, will be utilized in particle sizes less than about 20 microns. The most preferred polyoxyalkylene ether is polyethylene glycol having a molecular weight greater than 200 but less than 950. The cohesive strength imparting polymer will advantageously be polyvinyl pyrrolidone. The waxes and/or plasticizers utilized must be compatible with the materials of paragraphs (b) and (c), have a softening point below about 65° C., and exhibit satisfactory burnout characteristics. Preferred waxes include acetylated monoglyceride wax and polyethylene glycol wax. Other modifying additives frequently utilized in commercial adhesives, inks, and glass decorating formulations, such as dispersants, anti-oxidants, and defoamers may optionally be included at a maximum total of about 5% by weight without adversely disturbing the basic properties of the inventive products.

Again, since the inorganic fluxes, opacifiers, and pigments are omitted from the masking formulations, the proportions of the organic components will be adjusted to compensate therefor. Consequently, the organic components comprising the masking formulations will consist essentially, in weight percent, of about:

(a) 20–70% of a polyoxyalkylene ether;

(b) 10–45% of a water soluble, cohesive strength imparting polymer; and (c) 0–45% of a modifying wax and/or plasticizer.

The Type III organic medium consists essentially, by weight, of about 60–100% of a wax blended with about 0–40% of a polymeric viscosity modifier. Ideally, the wax will exhibit moderate to high polarity, and will demonstrate a softening (melt) point below about 65° C. or be prone to supercooling. Two examples of operable materials are Carbowax 6000, a polyethylene glycol wax marketed by Union Carbide, and Myracet 5-07, an acetylated monoglyceride marketed by Eastman Chemical Products, Inc., blended with 25% Ethocel Standard 4, ethyl cellulose marketed by Dow Chemical Company. Type III inks are the least desirable for offset printing because of their high sensitivity to the temperature of the offset surface. If permitted to solidify upon the offset surface, they cannot be transferred therefrom without reheating or by being contacted with an adhesive-coated surface. Moreover, such inks cannot be transferred at temperatures significantly above their softening (melt) points without hazarding smearing with consequent loss of print definition.

The coating applied by the method of the instant invention is essentially impermeable and can either be in the form of a continuous film or a detailed pattern. In either instance, the surface area of ware covered by the masking coating is protected against the adherence of a desired functional conductive, decorative, protective, or reflective coating applied thereover. Water rinsing with occasional light rubbing readily removes the masking cover as well as the functional coating superjacent to the masking cover.

This invention is particularly applicable for masking small detailed areas of ware surface requiring fine resolution. The thermoplastic masking coating can be applied via offset gravure or offset screening where the offset surface is composed of silicone rubber. A valuable advantage inherent in utilizing offset printing processes resides in the fact that the elastomeric nature of the offset surface permits ready conformance to irregularities in the surface of the ware substrate. The offset surface can also be so designed as to conform to a wide variety of ware shapes. For example, a flexible offset sheet can be employed for printing onto convex and concave surfaces of almost any geometry. Hence, for example, prints can be applied to the inside of bowls. Accordingly, the use of offset printing techniques permits both extreme versatility with regard to print location on ware and lenient tolerances with respect to the ware's dimensional or surface texture irregularities. Utilizing silicone for the offset surface enables total release of the masking coating which, in turn, allows the fine detail of an intricate design to be maintained. Gravure is the preferred technique for applying the print to the offset surface, but typographic and screening processes can likewise be employed. Flexographic printing can also be utilized, which process does not require an offset surface. However, silicone rubber must be used to fabricate the flexographic printing pad or roll.

One advantage of utilizing a hot melt ink in the masking formulation is that no predrying of the masking coating is required prior to application of a functional coating thereover. Stated otherwise, the functional coating can be applied immediately after the masking coating has been laid down. (It is apparent that when the functional coating is applied over the masking before any firing thereof, the solvents contained in the functional coating must not dissolve or react with the organic components in the hot melt inks or fine resolution will be lost). Thus, it has been found that adherence of the functional coating is prevented equally well whether it is immediately applied over the masking and subsequently fired, or whether the ware with the masking is heated to, e.g., temperatures of about 700° C. and higher, and the functional coating applied onto the heated surface. Finally, if desired, up to about 40% by weight of a refractory metal oxide release agent, such as is described in U.S. Pat. No. 3,932,681, supra, may be included in the thermoplastic masking coating formulation to make the masking coating more readily removable.

The following is a specific example of the inventive process.

A molten thermoplastic (not melt) organic medium demonstrating pressure sensitivity at temperatures slightly above room temperature was formulated consisting, in parts by weight, of:

| | |
|---|---|
| Ethylene-Vinyl Acetate Copolymer | 25 |

| | |
|---|---|
| (18% vinyl acetate, ASTM D1238 melt index of 150g/10 minutes) | |
| Amorphous Polypropylene (1000 cps at 375° F.) | 15 |
| Glycerol Ester of Hydrogenated Rosin (R&B softening point of 52° C.) | 40 |
| Mineral Oil (65 cps at 100° F.) | 20 |
| Octadecanol | 20 |

[It will be recognized that, by varying the above ingredients and, e.g., by utilizing a wax as a plasticizer rather than mineral oil, pressure sensitivities up to about 140° F. (60° C.) can be attained.]

Bentonite clay and titanium dioxide (particle size less than 149 microns) were blended into the molten ink in proportions to yield a homogeneous suspension consisting, in weight percent, of about 30% bentonite clay, 3⅓% titanium dioxide, and 66⅔% organic medium. Thereafter:

(1) an intaglio plate, having a date code etched therein and heated to 115° C., was flooded with the above liquid suspension, (2) the excess suspension was removed from the plate by doctor blading such that the mixture remained solely in the recessed areas of the plate;

(3) the plate was brought into contact with an offset pad made of a silicone rubber capable of being wetted by the molten organic medium, an operable material being SWS 04478 marketed by SWS Silicone Corporation;

(4) the plate was separated from the offset pad which caused the molten ink in the recessed areas of the plate to split, thereby creating a mirror image of the plate design on the offset pad;

(5) the ink immediately cooled to a tacky film on the offset pad and the pad was brought into contact with the surface of an opaque, white glass-ceramic article;

(6) the pad was removed from contact and the ink was transferred to the surface of the glass-ceramic article for which it exhibited greater affinity;

(7) the glass-ceramic article was heated in a kiln to about 600° C. which caused the organic portion of the ink to be volatilized off, the article was then removed therefrom, and, while hot, the surface thereof having the residual ink mixture thereon was sprayed with a water solution of tin chloride;

(8) the heated surface volatilized the solvent away and pyrolyzed the tin chloride to tin oxide (an electrically and thermally conductive coating); and thereafter (9) the glass-ceramic article was cooled and put through a commercial dishwasher cycle, without detergent, to remove the bentonite-titanium dioxide masking layer and the tin oxide coating superjacent thereto.

The date code was readily distinguishable as a white, uncoated design within a grayish-colored, tin oxide coated surface.

It will be understood that numerous modifications in both the materials used and the method steps followed are possible. For example, the masking coating can be printed onto either heat release- or pressure release-type decal paper and then subsequently transferred to the surface of ware just prior to application of the functional coating. Also, whereas the above-described specific example was directed to offset gravure printing which requires an intaglio surface, the use of this inventive process in flexographic printing would not require an intaglio surface. Further, the functional coating may be applied at room temperature, e.g., a decorative frit, and the mask and decorative frit fired simultaneously.

Finally, it will be appreciated that the thermoplastic masking material can be applied via such non-offset techniques as direct screening.

We claim:

1. A method for masking selected areas of a glass, glass-ceramic, or ceramic surface against coating compositions which comprises the steps of:
    (a) applying a thermoplastic molten masking coating consisting essentially, in weight percent, of about 10–60% bentonite clay, 0–40% of a refractory metal oxide, and 40–80% thermoplastic organic medium from a heated surface onto the surface of an elastomeric or silicone-coated body;
    (b) cooling said masking coating on said elastomer or silicone-coated body to a temperature at which said coating exhibits sufficient tack and cohesiveness to enable transfer of the resultant coating from the elastomeric or silicone-coated body to the surface to be masked;
    (c) bringing said elastomeric or silicone-coated body into contact with the surface of a glass, glass-ceramic, or ceramic article to transfer said coating to said article surface in said selected areas.

2. A method according to claim 1 wherein said refractory metal oxide is selected from the group consisting of silica, titania, iron oxide, tin oxide, calcium oxide, and 96% silica glass.

3. A method according to claim 1 wherein said thermoplastic masking coating demonstrates an R&B softening point between about 50°–95° C. and a viscosity at 100° C. of about 100–1000 poises.

4. A method according to claim 3 wherein said organic medium consists essentially, in weight percent, of about 10–40% of an ethylene-ester copolymer resin having about 8–40% by weight of a copolymerized resin selected from the group consisting of vinyl alcohol esters of $C_1$–$C_4$ saturated monocarboxylic acids and $C_1$–$C_5$ saturated alcohol esters of acrylic or methacrylic acid, the molecular weight of the copolymer being such as to yield a melt index, as defined by ASTM D1238, of about 20–400 g/10 minutes; about 20–40% of an amorphous tackifying resin having an R&B softening point of about 40°–110° C.; 0–20% of a modifying polyolefin resin selected from the group consisting of a low molecular weight polyethylene resin with a melt index, as defined by ASTM D1238, greater than about 20 g/10 minutes and an amorphous polypropylene resin having a melt viscosity of about 500–15,000 cps at 375° F.; and about 20–50% of an organic wax and/or plasticizer compatible with the above three groups of resins and having and R&B softening point of less than about 100° C.

5. A method according to claim 1 wherein said thermoplastic masking coating demonstrates an R&B softening point less than about 65° C. and a viscosity at about 93° C. of about 150–600 poises.

6. A method according to claim 5 wherein said organic medium consists essentially, in weight percent, of about 20–70% of a polyoxyalkylene ether having a softening point less than about 35° C. and a molecular weight between about 200–10,000; about 10–45% of a water soluble, cohesive strength imparting polymer having a molecular weight between 25,000–500,000; and 0–45% of a modifying wax and/or plasticizer selected from the group consisting of a polyoxyalkylene ether wax having a softening point between about 35°–65° C. and a molecular weight between about 1000–25,000 and a compatible ester having a softening point below about 65° C.

* * * * *